US005566150A

United States Patent [19]
Reno

[11] Patent Number: 5,566,150
[45] Date of Patent: Oct. 15, 1996

[54] MULTIBEAM OPTICAL APPARATUS AND METHOD FOR TRACKING CONTROL FOR AN OPTICAL DISK HAVING A SET OF TRACKS

[75] Inventor: Charles W. Reno, Cherry Hill, N.J.

[73] Assignee: Martin Marietta Corporation, Camden, N.J.

[21] Appl. No.: 313,502

[22] Filed: Sep. 26, 1994

[51] Int. Cl.⁶ .................................................. G11B 7/095
[52] U.S. Cl. .................. 369/44.26; 369/44.37; 369/275.3; 369/275.4
[58] Field of Search .............. 369/44.26, 44.37, 369/44.38, 111, 275.1, 275.2, 275.3, 275.4, 44.34

[56] References Cited

U.S. PATENT DOCUMENTS

| | | | |
|---|---|---|---|
| 4,807,210 | 2/1989 | Kaku et al. | 369/44.26 |
| 5,177,727 | 1/1993 | Mashimo | 369/44.37 |
| 5,208,792 | 5/1993 | Imanaka | 369/44.38 |
| 5,233,583 | 8/1993 | Reno | 369/44.37 X |

*Primary Examiner*—Aristotelis Psitos
*Assistant Examiner*—Thang V. Tran
*Attorney, Agent, or Firm*—W. H. Meise; G. H. Krauss; S. A. Young

[57] ABSTRACT

A multitrack optical disk has two or more circular or spiral tracks, which are recorded or played back in simultaneous sets for high data rates. Tracking is accomplished by sets of first and second tracking pads, which lie partially on and partially off the track paths. The amount of inter-track space required to accommodate the track pads is reduced by placing the overlap of the tracking pads in the same inter-track space, and by tracking any additional simultaneous tracks in excess of two by mechanical coupling with the first two.

7 Claims, 4 Drawing Sheets

MULTIBEAM OPTICAL APPARATUS AND METHOD FOR TRACKING CONTROL FOR AN OPTICAL DISK HAVING A SET OF TRACKS

The Government has rights in this invention pursuant to contract NAS 1-19566 with NASA.

FIELD OF THE INVENTION

This invention relates to recording and playback of information, including data, voice and/or video, onto, or from optical recording disks, and more particularly to optical disk tracking formats and associated apparatus for multitrack tracking for recording and/or playback.

BACKGROUND OF THE INVENTION

Optical disk recording and archiving schemes are becoming more common, and find use when large amounts of information are to be stored and retrieved. The amount of data which can be stored, and the data transfer rates, are great enough so that video can in some cases be recorded and played back in real time. In other contexts, multichannel data recorders may be used for recording large amounts of information in a short period of time, as for example during planetary flybys by exploratory spacecraft or during airborne or satellite military reconnaissance missions.

Figure 1:
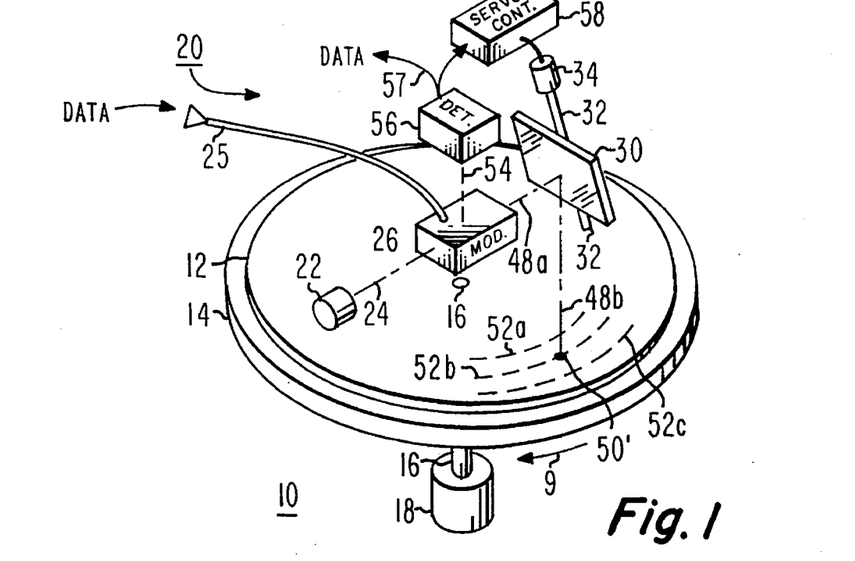
FIG. 1 is a simplified representation of a prior art recording and playback system for an optical disk.

During optical disc recording, the disk, which may be removable, is supported by a turntable, which is rotated relative to an optical head. FIG. 1 is a simplified representation of an optical disk apparatus 10 useful for recording information and playing it back. Such arrangements are often called simply "recorders" or "players" even though their principal use may be playback or recording, respectively. In FIG. 1, an optical disk 12, which may be a magnetooptical disk, is supported for rotation about a shaft 16 by a turntable 14, and the turntable, and therefore disk 12 lying thereon, is rotated by a motor 18. A tracking head, designated generally as 20, includes a light source, such as a laser diode 22, which generates a light beam 24. Light beam 24 enters a light modulator illustrated as a block 26. Modulator block 26, when recording is to be accomplished, modulates the light beam coupled thereto by laser diode 22. The modulation information is coupled to light modulator 26 from a source (not illustrated) by way of a data path 25. As an alternative to the combination of laser diode 22 and data modulator 26, the laser disk may itself be modulated by the data, in known fashion.

Light modulator 26 of FIG. 1 passes information-modulated light beam 48b, to a controllable mirror 30, which reflects the light beam to form reflected light beams 48b, directed toward the sensitive surface of optical disk 12. The light spot on the disk which results from beam 48b is represented by dot 50. Rotation of turntable 14 and disk 12 in the direction indicated by arrow 9 results in the tracking of spot 50 along a continuous spiral path on the disk, some of the turns of which spiral are illustrated, in part, by dashed paths 52a, 52b, and 52c.

Mirror 30 of FIG. 1 is hinged about a shaft 32, so that the mirror may be moved about the shaft by a motor or actuator 34, controlled by a tracking servosystem including a reflected light detector 56 and a servo control block 58. In tracking operation during either recording or playback, light reflected by the surface of disk 12 in response to light spot 50 is coupled by means (not illustrated) to light detector 56 as light beam 54. Detector 56 produces, on signal path 57, signals representative of the amplitude of the reflected beam, which in the case of a disk prerecorded with tracking pads as described below in conjunction with FIG. 2b, will include signals which represent the amplitude of beams 48 reflected from tracking pads 214 and 212, respectively. The detector output signal on signal path 57 may also include sensed data, which is made available to an output port (not illustrated). Servo block 58 of FIG. 1 processes the detected signals from signal path 57, by processing which may include synchronous gating, and may also include integration or averaging, and applies the resulting signals to a subtracting circuit, such as circuit 320 described in conjunction with FIGS. 3b and 3d. The subtracted signal may be further processed in servo block 58 of FIG. 1, as by amplification. The resulting control signal is coupled by a path 59 from servo block 58 to mirror actuator 34, which rotates the mirror in response to the control signal to direct the reflected beams 48 radially inward or outward, corresponding to "left" or "right" tracking, respectively. In this manner, a degenerative feedback loop is closed, by which the beam tends to follow the sensed track path (track).

Figure 2A:
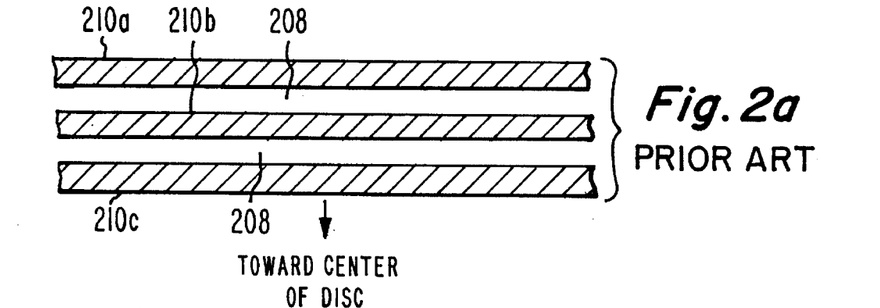
FIG. 2a illustrates three adjacent turns of a track path of a prior-art optical disk.

FIG. 2a illustrates portions of three adjacent unrecorded tracks 210a, 210b, and 210c, termed track paths herein, from among a large number of concentric turns of a single elongated optical track path on an optical disk. A track path is, therefore, the path which the recording light beam spot should follow as it traverses the disk. If the optical disk on which the unrecorded track paths of FIG. 2a are to be recorded has no actual tracking information, there may be no optical difference between the desired track path 210 and the nontrack spaces 208 between the track paths. In the absence of a predefined path on the disk, therefore, the recording path must be established by the recorder itself. To avoid this complexity, the unrecorded disk is often preformatted with a discernible track path.

Figure 2B:
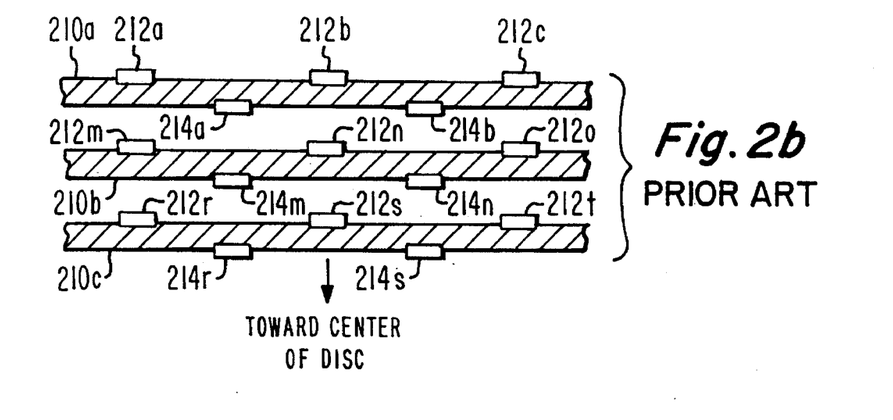

As illustrated in FIG. 2b, a common form of a discontinuous track path preformatting consists of tracking pads 212 and 214 adjacent to, and spaced along the track path 210, and on either side thereof. More particularly, in FIG. 2b the outermost turn 210a of the illustrated track path turns has spaced-apart tracking pads 212a, 212b, and 212c adjacent to the track path, and somewhat overlapping onto the outermost edge of the track. The next turn closer to the center of the disk, namely turn 210b, has spaced-apart tracking pads 212m, 212n, and 212o adjacent to, and somewhat overlapping onto the outer edge of the turn. The innermost illustrated turn 210c of the track path has spaced-apart tracking pads 212r, 212s, and 212t adjacent to, and overlapping onto the outermost edge. Similarly, the illustrated turns 210a, 210b, and 210c have spaced-apart tracking pads 214a, 214b, 214c, 214m, 214n, 214r, and 214s adjacent to, and overlapping onto the interior edges of the track path.

Figure 3A:
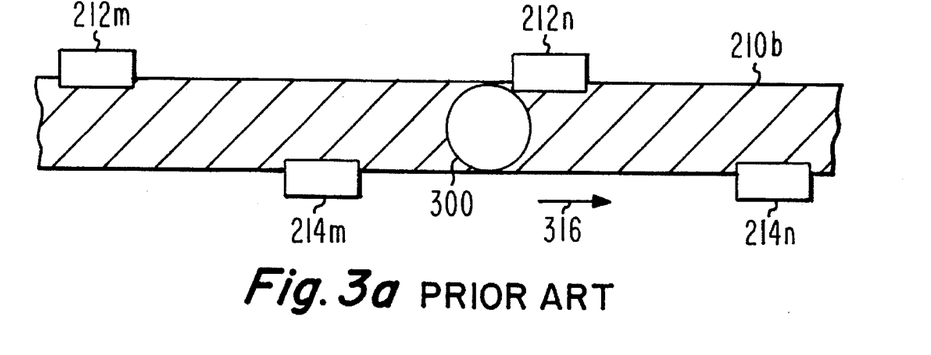
FIG. 3a illustrates a prior-art single-beam tracking format in relation to the track path and tracking pads of FIG. 2b.

When recording is to be accomplished on an optical disk preformatted as described in conjunction with FIG. 2b, the optical head of the arrangement of FIG. 1 produces a recording beam spot (spot) 310, as illustrated in FIG. 3a, impressed with the information or data to be recorded. Beam spot 310 periodically falls onto the exterior and interior tracking pads 212 and 214, respectively, during tracking. Spot 310 moves to the right in FIG. 3a, in the direction of arrow 316, relative to the disk and the track paths thereon. When tracking is correct, with recording spot 310 centered on track path 210b, some of the light of spot 310 periodically overlaps the innermost edges of tracking pads 212, but does not fully cover tracking pads 212 during its transit or traversal. Similarly, during correct tracking, some of the light of spot 310 overlaps the outermost edge of tracking pads 214 during its transit, but does not fully cover tracking pads 214. As a result, the light reflected from each of the tracking pads is not at a maximum during correct tracking, because light spot 310 does not fall completely onto either tracking pad. The light reflected by the two tracking pads 212, 214 is individually synchronously detected by the servo system of the arrangement of FIG. 1 by use of a clock signal derived from the tracking pads to form two tracking signals, and the two tracking signals are applied to a subtracting circuit, which is part of the tracking servo system by which the optical tracking head is controlled to keep the light beams on the desired tracks. When tracking is correct, as illustrated in FIG. 3a, the light reflected by outermost tracking pads 212 and that reflected by innermost tracking pads 214 will be approximately equal.

Figure 3B:
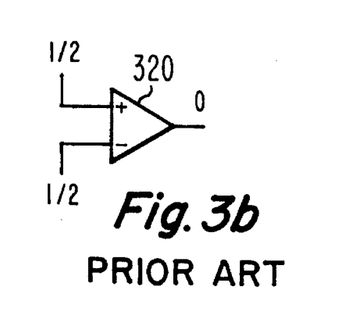
FIG. 3b illustrates a subtracting circuit used in a servo, such as that used in the apparatus of FIG. 1, for controlling tracking under the conditions illustrated in FIG. 3a, FIG. 3c is similar to FIG. 3a, but illustrates a mistracking condition which results in production of different sensed signals from the tracking pads.

FIG. 3b illustrates a subtracting circuit 320, which may be part of a servo system by which tracking is accomplished. Subtracting circuit 320 subtracts signals of equal magnitude, representing the equality of the two reflected beams during correct tracking, as illustrated in conjunction with FIG. 3a. The magnitude of each signal input is indicated as having the representative value of ½ or 0.5. The output signal of subtracting circuit 320 is therefore ½–½, which is zero. This output signal drives the tracking servosystem by which the light beam is deflected. With correct tracking, the drive signal at the output of subtracting circuit 320 is zero, indicating that no tracking correction is required.

Figure 3C:
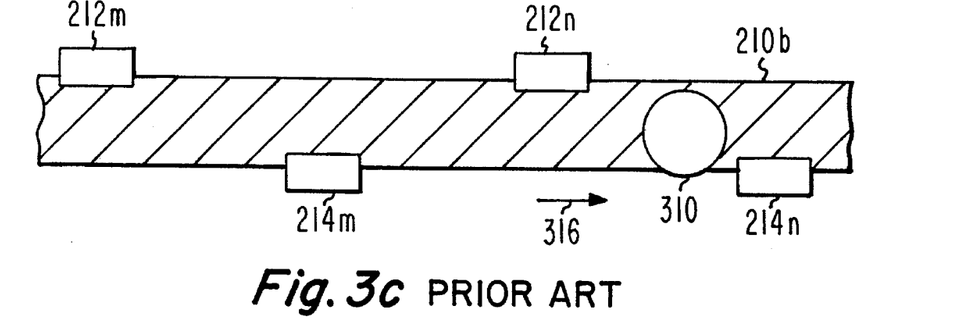
Figure 3D:
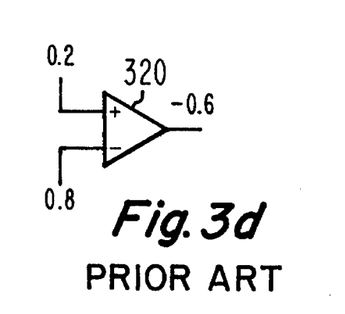
FIG. 3d illustrates the subtracting circuit of FIG. 3b with signal inputs corresponding to those resulting from the mistracking of FIG. 3c.
Figure 3E:
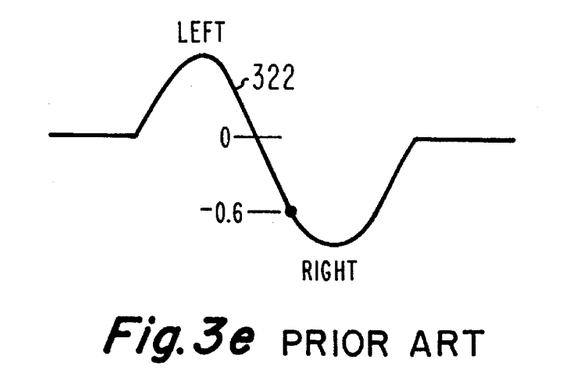
FIG. 3e is a plot representing the subtractor output for various amounts of mistracking.

In FIG. 3c, light spot 310 falling onto track path 210b is illustrated as being offset toward the center of the disk, or to the "right" for the indicated direction 316 of motion of the beam set relative to the disk. This offset constitutes a mistracking, in that the recording (or playback) beam is offset away from the center of the track path 210b. As a result of this mistracking, light spot 310, when it transits tracking pads 212, overlaps less than when tracking is correct. Consequently, the amount of light reflected by the tracking pads 212 as a result of transversal by light spot 310 is reduced. Similarly, light spot 310 overlaps tracking pads 214 more than during correct tracking, and more light is reflected by tracking pads 214. The reduced amount of light reflected from tracking pads 212, and the increased amount of light reflected by tracking pads 214 during mistracking to the right, as described in conjunction with FIG. 3c, modifies the tracking signals applied to the servo system. FIG. 3d represents the same subtractor 320 of FIG. 3b, with the positive input signal reduced to a value of 0.2, representing the lesser signal magnitude derived from light reflected from tracking pads 212, and with a greater signal of magnitude 0.8, representing an increased reflection of light by tracking pads 314, applied to the negative input of subtracting circuit 320. The resulting subtracted output signal, used to control the slewing of the optical head or the beams thereof, has magnitude −0.6. FIG. 3e plots the output of subtracting circuit 320 as a result of various degrees of mistracking, which is a conventional plot, well known in the art. The tracking system as so far described may be termed a single-beam tracking arrangement. The servo responds to the magnitude of the light reflected by the beam in such a manner as to close a degenerative feedback loop, for causing recording (or playback) beam 48b and its resulting light spot 310 to track the track path by following tracking pads 212, 214 adjacent to track path 210b. The recording (or playback) beam 310 tends to follow (track) the center of track path 210b.

Figure 4:
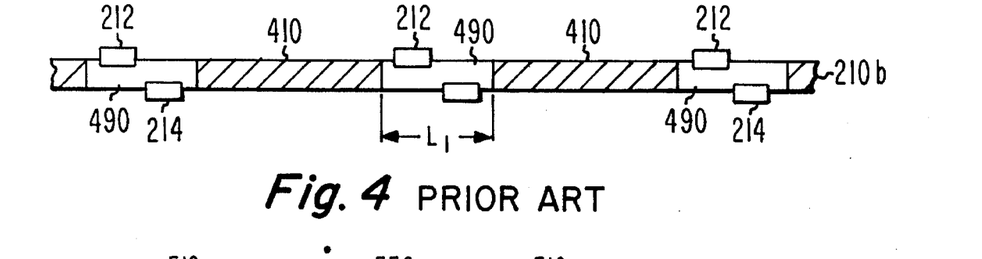
FIG. 4 illustrates a track path similar to that of FIG. 2b recorded with information only in the region between tracking pad pairs.

Playback is accomplished in the one-beam tracking arrangement by operating with the read beam set (often to a lower power) for recovering the data from the recorded track path, and using the same servomechanism to cause the read beam to track the recorded track path, which lies between the tracking pads. If the prerecorded or preformatted tracking pads are erasable, they may be recorded over during the recording operation, as a result of which playback tracking may not be possible, since some of the tracking pads may be completely overwritten. Consequently, the tracking pads may be preformatted on the disk in a non-erasable manner, i.e. in a manner which cannot be obliterated by the subsequent normal optical recording. A corollary of nonrecordable tracking pads is that, if the record beam passes over a tracking pad during the recording process, information or data will not be recorded at that location on the track path. In principle, the recorded track path will have only its edges overlying the tracking pads, and the recorded signal should experience only a slight diminution of amplitude at the location of a tracking pad. However, the tracking servosystem may allow transitory deviations of the recording from the desired track path, so that the entirety of the recorded track path may occasionally deviate from the desired track path lying between the two sets of tracking pads, and completely overlie a tracking pad. Under such conditions, the information would not be recorded onto the disk, and would be lost. The possible loss of information occasioned by overwriting the non-writable track pads is overcome by discontinuous information recording, namely by recording information only along the track path at locations lying between the tracking pads. FIG. 4 represents a track path 210b with tracking pads 212, 214, which is recorded with information or data only at discontinuous track portions 410, which are represented in FIG. 4 by hatching. Recorded track portions 410 are caused to lie between tracking pad sets 212, 214 by operation of the tracking servosystem described above, in response to light reflected from tracking pads 212, 214, all in known manner. A recurrent portion 490 of track 210b has length $L_1$, which encompasses adjacent tracking pads 212 and 214. Portion 490 is not recorded with information or data.

Other tracking arrangements are known, including one which uses beam splitters to split a light beam from a light source to form three spaced-apart beams with a fixed separation, a center one of which is modulated for recording, or which senses the recorded data for playback. The two outside beams of a three-beam system are substituted for the left and right tracking pads of the track path. Techniques for splitting the beams, for sensing recorded information for playback, and for tracking by use of a servo controlled by light reflected from tracking pads, are well known in the art. One of the disadvantages of the three-beam tracking arrangement is that, when a single light source is used to generate the three beams, less power is available for each of the three beams, which may reduce the power in the record beam, and thereby reduce the recording bandwidth (by requiring a longer dwell to achieve sufficient power for recording at a data spot), or the lesser power in the tracking beams may cause noisy tracking. Another tracking system uses a single beam, which is dithered across the track path. The decrease in reflected light amplitude as the beam tends to leave the track path provides the information required for a tracking servo to, on average, urge the beam toward the center of the track path. Dither-type tracking allows maximum beam power because only one beam is used, but has the disadvantage that a preformatted track path must exist on the disk before recording can begin, and it guarantees that the information signal-to-noise ratio (SNR) will change at the dither rate, because the tracking servo depends upon periodic mistracking in order to generate its input signals.

When multiple simultaneous tracks are required because of a large information bandwidth to be recorded or played back, tracking is, of course, still required. The optical head may produce a fixed set of record/playback light beams, radially spaced apart from each other by the track pitch, and therefore only one beam of the set of beams must be forced to follow a track by a tracking servo, because the remainder of the set of record/playback beams will track with the one which is servoed. When dither-type tracking is used in a multitrack situation, all of the tracks suffer from the periodic degradation of SNR, since all of the tracks move together. The three-beam tracking arrangement may be used with one of the multiple tracks, but has the disadvantage of differences among the bandwidths of the different tracks°

Improved optical disk multitrack tracking is desired.

SUMMARY OF THE INVENTION

In general, the invention includes a multitrack optical disk, which has two or more circular or spiral tracks, which are recorded or played back in simultaneous sets for high data rates. Tracking is accomplished by sets of first and second tracking pads, which lie partially on and partially off the track paths. The amount of inter-track space required to accommodate the track pads is reduced by placing the overlap of the tracking pads in the same inter-track space, and by tracking any additional simultaneous tracks in excess of two by mechanical coupling the beam deflection with the first two.

More specifically, a multitrack optical disk information record/playback apparatus with a tracking system for the track paths comprises an optical disc including a plurality of simultaneously accessible, elongated, mutually parallel, radially displaced track paths, with a non-information space lying between each of the track paths and an adjacent one of the track paths. The track paths are grouped into tracking sets. Each one of the tracking sets of track paths is associated with first and second sets of discontinuous tracking pads, which are spaced along the lengths of the track paths. The tracking pads of the first set of tracking pads are radially located partially on a first one of the track paths, and partially on one of the non-information spaces which lies between the first one of the track paths and a second track path of the set of track paths, which second track is immediately adjacent to the first one of the track paths. The tracking pads of the second set of tracking pads is radially located partially on the second one of the track paths, and partially on the first one of the non-information spaces, which lies between the first one of the track paths and the second one of said track paths. The apparatus also includes a support for supporting the optical disk, and a tracking head, which includes a control signal input port for, in response to a control signal applied to the control signal input port, controllably directing a set of plural mutually parallel light beams toward the track paths of the set of track paths, for generating light spots thereon, for transducing information with the track paths. The tracking pads reflect light to form a reflected beams. A rotational drive is coupled to the support for rotating the support and an optical disk supported thereby relative to the tracking head, for generating relative motion between the track paths and the spot beams. The apparatus also includes a control arrangement coupled to the tracking head for sensing the amplitude of the reflected beams originating with the first and second track paths, for responding to amplitude changes attributable to the tracking pads for generating the control signal, and for coupling the control signal to the control signal input port of the tracking head, for closing a degenerative feedback loop, which feedback loop tends to maintain the light spots on the track paths.

A method according to the invention transduces information with a set of mutually parallel track paths on an optical disk. The parallel track paths are spaced apart from each other by a particular dimension. The method includes the step of associating tracking pads of a first set of tracking pads with a first one of the track paths, with each tracking pad overlapping a particular edge of the first track path and onto a first non-information space adjacent the first track path. The method also includes the step of associating tracking pads of a second set of tracking pads with a second one of the track paths immediately adjacent the first one of the track paths, and separated therefrom by the first non-information space, with the tracking pads of the second set of tracking pads overlapping that edge of the second one of the track paths which is adjacent the first non-information space and onto the first non-information space. First and second light beams are directed toward the optical disk, with the light beams spaced so that the resulting first and second light spots on the optical disk are spaced apart by the inter-track dimension. The disk is rotated about a center, so that the light spots run parallel to the track paths, whereby the light spots traverse the first and second tracking pads, and generate first and second reflected light beams therefrom. The direction of the first and second light beams is controlled in a direction radial to the center and in response to a control signal, whereby the positions of the first and second light beams are controlled in a direction transverse to the track paths. The first and second light beams are processed for generating the control signal, and for closing a degenerative feedback loop tending to maintain the first and second light spots on the first and second track paths, respectively

DESCRIPTION OF THE DRAWINGS

FIG. 2b represents preformatted tracking pads associated with the turns of FIG. 2a;

DESCRIPTION OF THE INVENTION

Figure 5A:
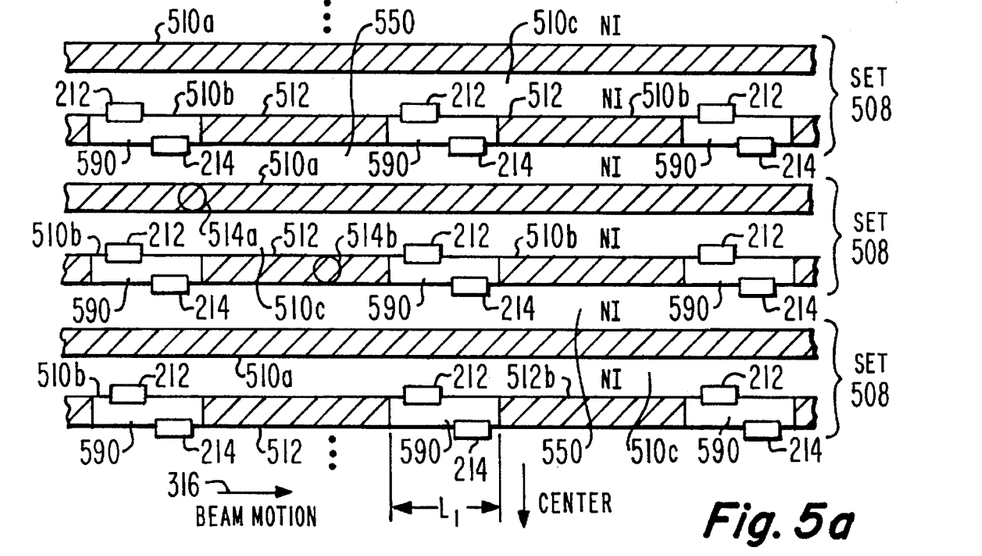
FIG. 5a illustrates an optical disk format arrangement using two simultaneous tracks and tracking pads.

FIG. 5*a* illustrates a set of two track paths, which are simultaneously scanned by two spaced-apart information light beams. In FIG. 5*a*, a total of six track path segments are illustrated, three of which are designated 510*a*, and three of which are designated 510*b*, with the 510*a* track paths alternating with the 510*b* track paths. The illustrated track path segments are simply portions of different turns of two elongated parallel or interleaved spiral track paths 510*a* and 510*b*, and thus all the track paths designated 510*a* are portions of a single track path, and all the track paths designated 510*b* are portions of another, different single track path. Each set of associated tracks of a turn are identified in FIG. 5*a* by the word "set" and the designation 508. As illustrated in FIG. 5*a*, track path 510*b* is associated with a plurality of tracking pads, designated 212 and 214 to conform with FIG. 2*b*, so that the set of two tracks 510*a* and 510*b* can be tracked as a unit by a servomechanism which causes the light beams to track or follow track path 510*b*. Tracking simultaneously with writing (or with reading) is accomplished by a set of two simultaneously generated, spaced-apart light beams. The two spaced-apart light beams may be generated by a beam-splitting arrangement, as known in the prior art, and as described in conjunction with FIG. 7. The two beams form light spots 514 illustrated as falling on the center set of track paths of FIG. 5*a*. More particularly, in the correct tracking condition, an information light spot 514*a* for a first information channel falls onto the center of track path 510*a*, and second information light spot 514*b* for the second information channel falls onto the center of track path 510*b*, for periodically traversing the edges of tracking pads 212 and tracking pads 214. The two light beam spots 514*a* and 514*b* are generated with fixed spacing, and track together. Consequently, the tracking correction applied to light beam spot 514*b* to cause it to track path 510*b* causes correct tracking of spot 514*a* over track path 510*a*.

The arrangement of FIG. 5*a* is disadvantageous, because of the difference in bandwidth of the information channels defined by the two track paths 510*a* and 510*b*. This difference in bandwidth arises due to the fact that, as described above in conjunction with FIG. 4, the information-carrying portion of track 510*b* cannot include the non-recorded regions 590 (length $L_1$) subtending the tracking pads. Consequently, the region available for recording and playback on track path 510*b* of FIG. 5*a* includes the discontinuous hatched regions designated 512*b*, and does not include the recurrent non-hatched regions 590, while the region available for recording and playback on track path 510*a* is the entire hatched region, namely the entire track path. Assuming that the read and write data rates (or the bandwidth in the case of analog signals) are the same for both information spots 514*a* and 514*b*, less data can be written onto a given length of track path 514*b* compared with a corresponding length of track path 514*a*. Considering that the rotational rate of the disk is the same for both track paths, and disregarding the small differences in the length of adjacent tracks due to their positions on the disk, this results in a lesser information storage in track path 510*b* than in 510*a* during the same time interval, which corresponds to a difference in data rate.

Figure 5B:
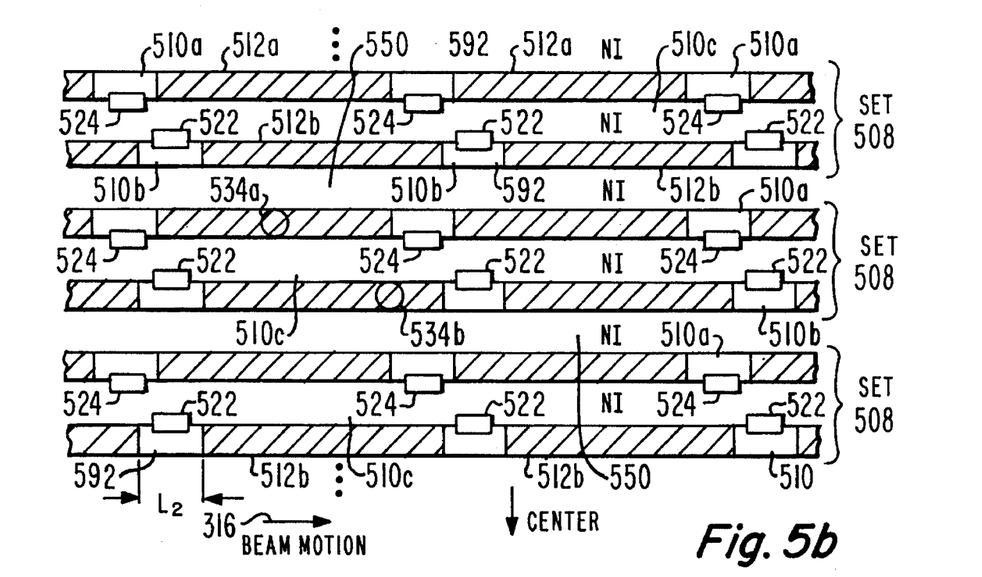
FIG. 5b illustrates an improved format arrangement in accordance with an aspect of the invention.

According to an aspect of the invention, half of the tracking pads are associated with one of the track paths, and the other half with the other one of the track paths. FIG. 5*b* is similar to FIG. 5*a*, but differs in that outer edge tracking pads 522 are associated with track path 510*b*, while inner edge tracking pads 524 are associated with track path 510*a*. More particularly, as illustrated in conjunction with the central set of track paths 510*a* and 510*b* in FIG. 5*b*, for the situation of correct tracking, a first information read or record light beam spot 534*a* falls onto track path 510*a*, and a second light beam spot 534*b* for the second information channel falls onto track path 510*b*. Light spot 534*a* also periodically falls onto the inner edge of track path 510*a*, so as to periodically traverse tracking pads 524, while light spot 534*b* falls onto the outer edge of track path 510*b*, so as to periodically traverse tracking pads 522. The servo operating on the light reflected from the tracking pads functions in the same manner as that described above, moving the set of light beams 534*a* and 534*b* together, so that light spots 534*a* and 534*b* tend to follow track paths 510*a* and 510*b*, with spots 534*a* and 534*b* overlying track paths 510 and 510*b*, respectively, for reading or writing information, as the situation may require. In FIG. 5*b*, the regions which can be used for recording and reading information are the hatched regions designated 512*a* and 512*b*. The non-recorded regions are designated 592, to distinguish from regions 590 of FIG. 5*a*, because regions 592 occur in both tracks 510*a* and 510*b*, and because their lengths are $L_2$, which length is less than length dimension $L_1$ of FIG. 5*a*. As illustrated, the hatched (recorded or data) regions of track path 510*b* are a greater proportion of the track length, because one of the sets of tracking pads has been removed, so that there is only one set of tracking pads associated with track path 510*b*. Consequently, non-information region 590 needs only have a length $L_2$, which is less than length $L_1$ in FIGS. 4 and 5*a*, and the information which can be transduced with track path 510*b* per unit length or per unit time is greater than in the arrangement of FIG. 5*a*. Consequently, the bandwidth of track path 510*b* is greater, all else being equal, than in FIG. 5*a*. Similarly, the amount of information which can be transduced with track path 510*a* of FIG. 5*b* is less than in the arrangement of FIG. 5*a*, because information cannot be recorded onto those regions of track path 510*a* overlying, or associated with, tracking pads 524. Thus, the bandwidths of the two track paths of FIG. 5*b* are more equal than the arrangement of FIG. 5*a*.

The arrangement of FIG. 5*b* has the further advantage over the arrangement of FIG. 5*a*, in that the tracking pads are adjacent to, or extend into, the same one of the inter-track non-information (NI) gaps or spaces, and therefore the other one of the inter-track non-information gaps or spaces can be reduced in width, if desired, for increasing the track packing density on the disk. This, in turn, increases the total storage density available on the disk, without increasing the bandwidth along any one track. More particularly, the designation 510*c* is used in FIGS. 5*a* and 5*b* to denote the non-information region between the track paths of a set. Thus, each set of two tracks 510*a* and 510*b* has a non-information gap 510*c* lying therebetween. Between each set of two tracks (with its non-information gap 510*c*) and the adjacent set of two tracks lies a further non-information inter-set gap 550. As can be seen in FIGS. 5*a* and 5*b*, the inter-track-path gaps 510*c* of each set of track paths alternate with inter-set gaps 550. In the arrangement of FIG. 5*a*, a tracking pad 212 or 214 projects into each gap 510*c* or 550; tracking pads 212 project into inter-track gap 510*c*, while tracking pads 214 project into inter-set gaps 550. This places a minimum limit on the width of the gaps, which width must be at least as great as the projection of the tracking pad, plus some additional amount for tolerance (if the tracking pad of a track adjacent to the track being followed is too close, mistracking of the light beam may cause reflection from that adjacent tracking pad which may confuse the servosystem). Consequently, both non-information gaps 510c and 550 of FIG. 5a have a minimum dimension established by the dimensions of the tracking pads and the necessary tolerance. By contrast, in the arrangement of FIG. 5b, both tracking pads 522 and 524 project into the same gap, namely into inter-track gap 510c, and no tracking pads project into inter-set gap 550. As a result, the width or transverse dimension of inter-set gap 550 may be reduced, if desired, to a dimension less than the projection of the tracking pad. This reduced spacing on alternate gaps in the format, in turn, increases the amount of the surface of the optical disk which is available for recording.

Figure 6:
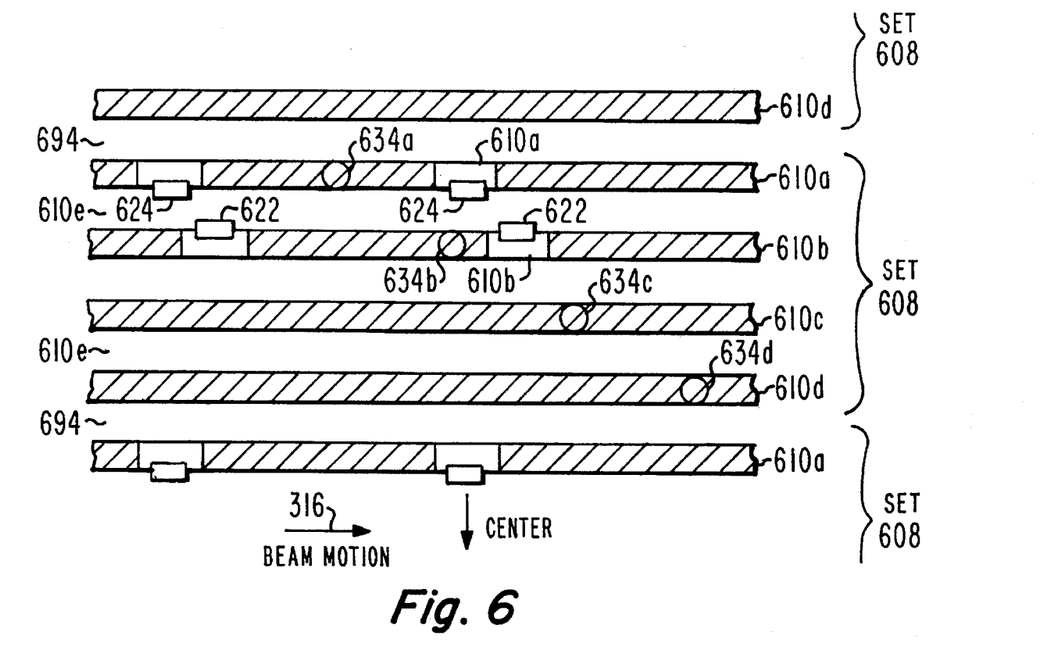
FIG. 6 illustrates a four-simultaneous track format in accordance with another aspect of the invention.

FIG. 6 illustrates a disk format with four track paths 610a, 610b, 610c, and 610d in each set 608. The non-information gap 610e lies between track paths 610a and 610b of the track path set, and is dimensioned to accommodate the projections of associated tracking pads 622 and 624. In the nominal tracking state, information light beam spots 634a, 634b, 634c, and 634d are spaced by the same dimension as the inter-track spacing, and fall on track paths 610a, 610b, 610c, and 610d, respectively. During tracking, light beam spots 634a and 634b partially overlap tracking pads 624 and 622, respectively. In the event of mistracking to the right, relative to beam motion direction 316, beam spot 634a overlaps tracking pads 624 more, and beam spot 634b overlaps tracking pads 622 less, with the result that the reflection from tracking pads 624 decreases, and the reflection from tracking pads 622 increases, thereby providing the information required for the servosystem to adjust the position of the set of beams so as to urge spots 634a and 634b toward the centers of track paths 610a and 610b, respectively. The tracking of track paths 610a and 610b by light beam spots 634a and 634b controls the position of the set of light beams which for light beam spot set 634a-634d transverse to the tracks, and thereby causes the light spots to track or follow the entire set of four track paths 610a-610d. This arrangement has the advantage that only one of the inter-track gaps, namely gap 610e, needs to have sufficient width to accommodate the projection of the tracking pads 622, 624, while the remainder of the inter-track gaps, such as the gap between track paths 610b and 610c, and between 610c and 610d, as well as the inter-set gap 694, can be reduced in width, to further increase the storage density on the disk over that described in conjunction with FIG. 5b.

Figure 7:
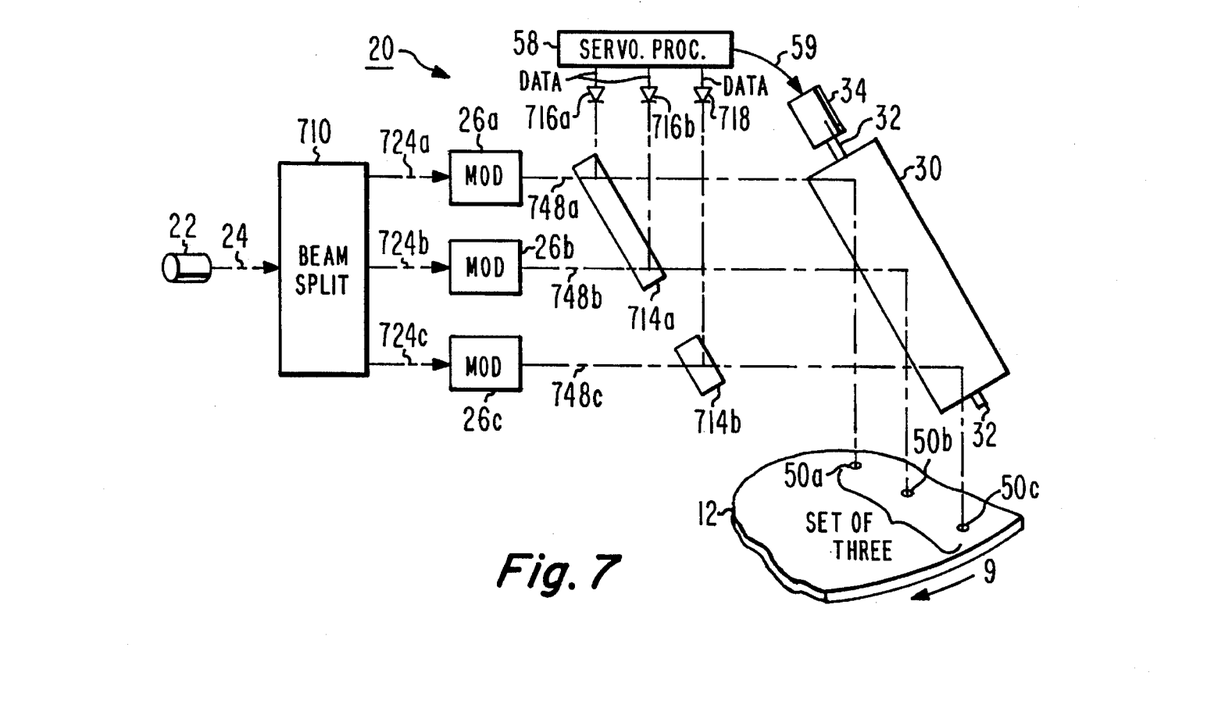
FIG. 7 is a simplified block diagram of an apparatus generally equivalent to that of FIG. 1, arranged for operation with an optical disk formats similar to those of FIGS. 5*b* or 6, but having three tracks.

FIG. 7 is a simplified block diagram illustrating a system similar to that of FIG. 1, modified to provide plural tracks in accordance with the invention. Elements of FIG. 7 which correspond to those of FIG. 1 are designated by like reference numerals. In FIG. 7, laser 22 produces a light beam 24, which is applied to a beamsplitter 710. Beamsplitter 710 produces three separate, mutually parallel, spaced-apart light beams 724a, 724b, and 724c, which are individually applied to a set of three data modulators 26a, 26b, and 26c, for being modulated by data to be recorded. Modulators 26a, 26b, and 26c produce data-modulated light beams 748a, 748b, and 748c, respectively. Light beams 748a and 748b pass through a partially-reflecting (half-silvered mirror) 714a, and are reflected from tracking mirror 30, and illuminate spots 50a and 50b on the surface of optical disk 12. Modulated light beam 748c passes through a mirror 714b, illustrated as separate from mirror 714a only to emphasize the difference between beam 748c and beams 748a, 748b. Beam 748c is also reflected by tracking mirror 30, and falls onto the surface of disk 12. Thus, all three data-modulated recording beams fall onto disk 12 for recording (and for playback).

In the arrangement of FIG. 7, tracking is accomplished by light reflected from the tracking pads (not illustrated in FIG. 7) associated with the tracking paths on the disk. The reflected light beams return along the same path as the incident beam, and are reflected by tracking mirror toward partially reflecting mirrors 714a and 714b. Mirrors 714a and 714b divert the reflected light beams toward optical detectors illustrated by diode symbols 716a, 716b, and 716c. The light reflected due to light beams 748a and 748b is coupled to detectors 716a and 716c, respectively. Detectors 716a and 716c are coupled to servo processor block 58, which processes the reflected signals, as described above, by gating, averaging, subtracting, and the like, in known fashion, to produce a control signal for application over path 59 to mirror drive motor 34, and to close a degenerative feedback loop which urges the light beams and resulting spots 50a, 50b, toward the center of the tracking paths. Beam 748c, which is generated parallel with the other two beams, and which is reflected by the same mirror, tracks along with beams 748a and 748b.

During playback in the arrangement of FIG. 7, the modulators 26a, 26b, and 26c are deenergized, and unmodulated beams are applied to disk 12. The reflected beams, modulated by the data on the disk, is applied, as described above, to detectors 716a, 716b, and 716c. Tracking is accomplished in the same manner as described above, by processing the two channels associated with beams 748a and 748b, and controlling mirror 30 in a feedback manner. The data at the outputs of detectors 716a and 716b is applied to a data output port (not illustrated) in addition to being applied to the servo processor block 58. The data at the output of detector 718, associated with the channel read by light beam 748c, is applied directly to another data output port (not illustrated).

Other embodiments of the invention will be apparent to those skilled in the art. In particular, while magnetooptic recording has been described, the principles of tracking according to the invention are applicable to other types of recording, so long as the type of recording results in an amplitude change of the reflected signal when the spot(s) cross a tracking pad. The track path may be spiral (a single track or set of tracks, spiralling inward or outward) or circular (a discrete number of circular paths, each complete in itself), and may be discontinuous. The disk may be removable, or a plurality of disks may be individually replaceable on the turntable by a changer, or a plurality of disks may be simultaneously rotated, with each accessed by a separate arrangement as described in conjunction with the FIGURES. While sets of two and four information tracks have been described, it will be apparent that three-track sets, or five- or more-track sets may be used, with the storage density of the disk increasing with each additional track in the tracking set.

APPENDIX A

1. A multitrack optical disk information record/playback apparatus (10) with tracking system (20) for the track paths (210; 510; 610), said apparatus comprising:
    an optical disc (12) including a plurality of simultaneously accessible, elongated, mutually parallel, radially displaced track paths (510; 610), with a non-information space (510c; 610e) between each said track path and an adjacent one of said track paths, with said track paths being grouped into tracking sets (508; 608), each one of said tracking sets (508; 608) of track paths (210; 510; 610) being associated with first (212) and second (214) sets of discontinuous tracking pads spaced along the lengths of said track paths, said tracking pads (212) of said first set of tracking pads being radially located partially on a first one (510b; 610b) of said track paths, and partially on one of said non-information spaces (510c; 610e) which lies between said one of said track paths (510b; 610b) and a second track path (510d; 610d) of said set (508; 608) of track paths which is immediately adjacent to said first one of said track paths, said tracking pads (214) of said second set of tracking pads being radially located partially on a second one (510a; 610a) of said track paths, and partially on said one of said non-information spaces (510c; 610e) which lies between said first one of said track paths (510b; 610b) and said second one of said track paths (510a; 610a), said apparatus comprising:

support means (14) for supporting said optical disk (12);

a tracking head (22, 26, 30, 34; 22, 710, 26, 30, 34) including a control signal input port (59) for, in response to a control signal applied to said control signal input port, controllably directing a set of a plurality of light beams toward said track paths of said set of track paths, for generating light spots thereon for transducing information with said track paths, as a result of which each of said light beams is reflected by one of said track paths to form a reflected beam;

rotational means (18) coupled to said support means (14) for rotating said support means (14) and an optical disk supported thereby relative to said tracking head, for generating relative motion between said track paths and said spot beams; and control means (56, 57, 58; 714, 716, 58) coupled to said tracking head (22, 26, 30, 34; 22, 710, 26, 30, 34), for sensing the amplitude of said reflected beams originating with said first (510b; 610b) and second (510a, 610a) track paths, for responding to amplitude changes attributable to said tracking pads for generating said control signal, and for coupling said control signal to said control signal input port of said tracking head, for closing a degenerative feedback loop, which feedback loop tends to maintain said light spots on said track paths.

What is claimed is:

1. A multitrack optical disk information record/playback apparatus with tracking system for the track paths, said apparatus comprising:

an optical disc including a plurality of simultaneously accessible, elongated, mutually parallel, radially displaced track paths, with a non-information space between each said track path and an adjacent one of said track paths, with said track paths being grouped into tracking sets, each of said tracking sets including at least two non-information spaces, each one of said tracking sets of track paths being associated with first and second sets of discontinuous tracking pads spaced along the lengths of said track paths, said tracking pads of said first set of tracking pads being radially located partially on a first one of said track paths, and partially on one of said non-information spaces which lies between said one of said track paths and a second track path of said set of track paths which is immediately adjacent to said first one of said track paths, said tracking pads of said second set of tracking pads being radially located partially on said second one of said track paths, and partially on said one of said non-information spaces which lies between said first one of said track paths and said second one of said track paths, at least one of said non-information spaces of each of said tracking sets being free from overlying tracking pads, said apparatus comprising:

support means for supporting said optical disk;

a tracking head including a control signal input port for, in response to a control signal applied to said control signal input port, controllably directing a set of a plurality of light beams toward said track paths of said set of track paths, for generating light spots thereon for transducing information with said track paths, as a result of which each of said light beams is reflected by one of said track paths to form a reflected beam;

rotational means coupled to said support means for rotating said support means and an optical disk supported thereby relative to said tracking head, for generating relative motion between said track paths and said spot beams; and control means coupled to said tracking head, for sensing the amplitude of said reflected beams originating with said first and second track paths, for responding to amplitude changes attributable to said tracking pads for generating said control signal, and for coupling said control signal to said control signal input port of said tracking head, for closing a degenerative feedback loop, which feedback loop tends to maintain said light spots on said track paths.

2. An apparatus according to claim 1, wherein said tracks paths are one of circumferential and spiral.

3. An apparatus according to claim 1, wherein each of said sets of track paths has two separate information track paths with two non-information spaces lying therebetween, and said tracking pads of said first and second sets of tracking paths lie partially on one of said single noninformation spaces and not the other.

4. An apparatus according to claim 1, wherein said support means allows removal of said optical disc.

5. An apparatus according to claim 1, wherein each said set of track paths includes at least a third track path, and said third track path is overlain by no tracking pads.

6. An apparatus according to claim 1, wherein said optical disk is magnetooptic.

7. A method for transducing information with a set of mutually parallel track paths, spaced apart from each other on an optical disk, said method comprising:

associating tracking pads of a first set of tracking pads with a first one of said track paths, with each tracking pad overlapping a particular edge of said first track path and onto a first non-information space adjacent said first track path and not overlapping a second non-information space adjacent said first track path;

associating tracking pads of a second set of tracking pads with a second one of said track paths immediately adjacent said first one of said track paths, and separated therefrom by said first non-information space, with said tracking pads of said second set of tracking pads overlapping that edge of said second one of said track paths which is adjacent said first non-information space and onto said first non-information space, and no tracking pads overlapping that one of said non-information spaces adjacent to said second one of said track paths which is not said first non-information space;

directing first and second light beams toward said optical disk, with said light beams spaced so that the resulting first and second light spots on said optical disk are spaced apart by a dimension;

rotating said disk about a center, so that said light spots run parallel to said track paths, whereby said first and second light spots traverse said first and second tracking pads respectively, and generate first and second reflected light beams therefrom;

controlling the direction of said first and second light beams, in a direction radial to said center, in response to a control signal, whereby the positions of said first and second light beams are controlled in a direction transverse to said track paths; and processing said first and second reflected light beams for generating said control signal, and for closing a degenerative feedback loop tending to maintain said first and second light spots on said first and second track paths, respectively.

* * * * *